C. H. JOHNSON.
Gas Burner.
No. 467. Rejssued June 2, 1857.
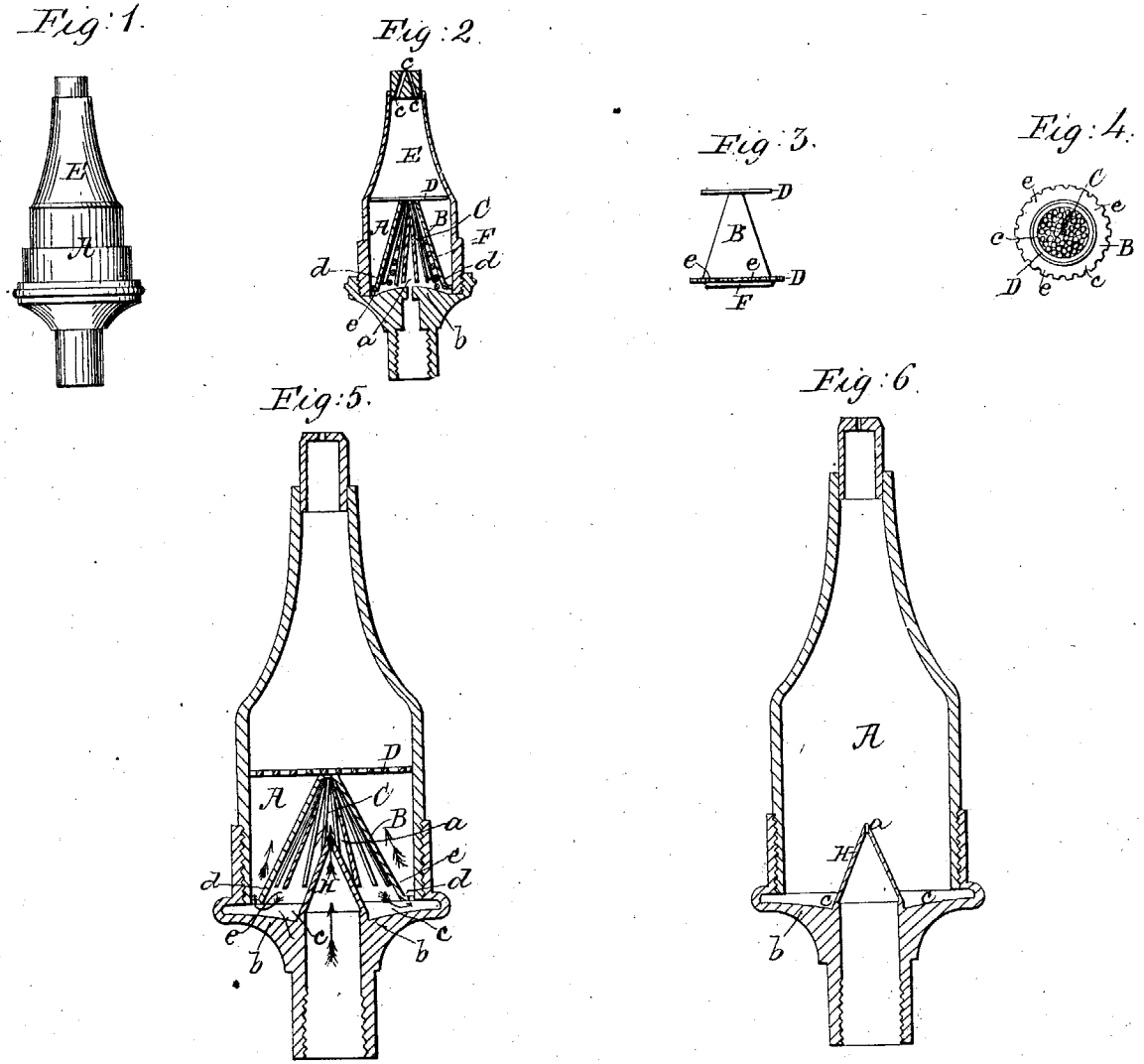
N. PETERS. Photo-Lithographer, Washington, D. C.

UNITED STATES PATENT OFFICE.

CHARLES H. JOHNSON, OF BOSTON, MASSACHUSETTS.

IMPROVEMENT IN GAS-BURNERS.

Specification forming part of Letters Patent No. 13,130, dated June 26, 1855; Reissue No. 459, dated March 18, 1856; Reissue No. 467, dated June 2, 1857.

*To all whom it may concern:*

Be it known that I, CHARLES H. JOHNSON, of Boston, in the county of Suffolk and State of Massachusetts, have invented certain new and useful Improvements in Gas-Burners; and I do hereby declare that the same are fully described and represented in the following specification and the accompanying drawings, of which—

Figure 1 exhibits an external view of one of my improved burners. Fig. 2 is a vertical and central section of the same. Fig. 3 is a side view of its distributer and purifier. Fig. 4 is an under side view of said distributer and purifier. Fig. 5 is a section of the gas-burner, showing an additional improvement of it. Fig. 6 exhibits the burner without the distributer and purifier, but with the orifice or inlet for the gas elevated above the base of the chamber or the burner, and so as to form a space below the orifice and for reception or conveyance of tarry matters away from the orifice.

The said gas burner is constructed with a cylindrical chamber, A, into which the gas is received through a small gage hole or orifice, *a*, formed through the bottom *b* of said chamber, the said bottom being made to slope away from the said orifice so as to form a channel around it for reception of the tarry matters which may flow down around the orifice, such channel serving to prevent the orifice from becoming choked by such tar. In Fig. 6 the orifice *a* is shown as made at the apex of a cone raised on the bottom of the chamber A of the burner and up into the same. Within the chamber A, as shown in Fig. 2, there is arranged a hollow-cone distributer, B, which is open at its lower end, and contains a series of wires, as seen at C, they being arranged somewhat like the bristles of a brush and made to extend downward from the vertex of the cone, and to constitute a purifier or a means of dividing or purifying the gas or separating from it much foreign matter which, if consumed with the gas, would be detrimental to its light-giving property. The upper part of the distributer B is fastened to a diaphragm or plate, D, which is perforated so as to permit gas to freely pass through it and into a tapering or bell-mouthed chamber, E, arranged over the chamber and between it and the discharging mouth or mouths *c c* of the burner. This diaphragm is forced up against the top of the chamber A by means of a spring, F, which is arranged within the distributer and presses against the bottom of the chamber A. The base of the distributer I provide with a flange, *d d*, whose external surface is serrated or notched, as seen at *e e*, the object of the flange being to centralize the distributer within the chamber, such distributer, when in use being somewhat elevated above the bottom of said chamber. In the operation of a burner so constructed the gas, on entering it, passes and flows among the wires of the purifier, and by means of the distributing-cone is reverberated and thrown outward and made to pass underneath the flange *d* and upward into the chamber A, from whence it flows through the plate or diaphragm D and into the tapering or gathering chamber E, placed over the same. By means of this last-named chamber the streams of gas are caused to gradually approach one another and flow freely toward the discharging-orifices without such injurious impingement against one another as will produce a flickering of the flame. By means of the tapering chamber great steadiness of the flame is obtained. When the distributer and purifier are used, a very important change in the color of the flame takes place, and it is found that scarcely any tar or foreign matter is received into the main part of the thamber A and the burner.

In Fig. 5 is shown a vertical and central section of a gas-burner with my additional improvement, the nature of which consists in raising a cone or its equivalent upon and above the bottom of the distributing-chamber, and so as to extend up into the same or into the distributer and purifier, and to have the gas-inlet opening situated at or near the apex of said cone, the gas passing through the body of said cone and being discharged from the top thereof directly in among the wires of the purifier.

In the drawings, A exhibits the cylindrical chamber of the gas-burner; *a*, the orifice of injection of gas; B, the hollow-cone distributer; C, its purifier or series of wires, they being made to extend downward within the conical distributer, and so as to spread over and around the cone H, raised on the bottom *b* of the chamber A, as seen in the drawings. By means of said cone, provided with the inlet-orifice at its apex, the tarry or liquid deposit which is formed within the chamber A or the distributer will pass down into the space *e e* around the cone, and so as not to clog the inlet-opening. Besides this advantage of the cone, the gas is discharged by it directly into the midst of the wires of the purifier or high up into the series of said wires, and is thence made to flow through them downward around the cone, so as not only to be thoroughly distributed among the wires, but to operate to keep the outer surface of the cone clear of tarry deposit. Unless the cone is placed in such relation to the wires and the distributer, the gas, when under low pressure, is liable to pass under the bottom edge of the distributer without being properly circulated among the wires of the purifier.

What I claim is—

1. Combining the gas distributer B, or the same and the purifier C, as herein described, with the burner, so as to operate therewith substantially as set forth.

2. Elevating the top of the orifice *a*, for injecting the gas into the chamber of the burner, above the base of said chamber by a cone or its equivalent, and so as to form a channel around said orifice for holding tarry matter, as well as for removing it from the orifice.

3. Extending the orifice *a* into the distributer and among its wires so as to attain advantages as above explained.

In testimony whereof I have hereunto set my signature this 20th day of May, A. D. 1857.

CHARLES H. JOHNSON.

Witnesses:

R. H. EDDY,

F. P. HALE, Jr.